US006707509B2

(12) United States Patent
Chauvin et al.

(10) Patent No.: US 6,707,509 B2
(45) Date of Patent: Mar. 16, 2004

(54) METHOD FOR ADJUSTING CONVERGENCE IN A PROJECTION TELEVISION RECEIVER

(75) Inventors: Jacques Chauvin, Mönchweiler (DE); Bernhard Malota, Mönchweiler (DE); Albert Runtze, Villingen-Schwenningen (DE)

(73) Assignee: Thomson Licensing S.A., Boulogne (FR)

( * ) Notice: Subject to any disclaimer, the term of this patent is extended or adjusted under 35 U.S.C. 154(b) by 430 days.

(21) Appl. No.: 09/879,290

(22) Filed: Jun. 12, 2001

(65) Prior Publication Data

US 2002/0015113 A1 Feb. 7, 2002

Related U.S. Application Data

(63) Continuation-in-part of application No. 08/990,935, filed on Dec. 15, 1997, now abandoned.

(30) Foreign Application Priority Data

Jan. 4, 1997 (DE) .......................................... 197 00 204

(51) Int. Cl.⁷ ............................ H04N 9/286; H04N 9/31
(52) U.S. Cl. ........................ 348/745; 348/807; 348/806; 348/744; 348/813; 348/747; 315/368.11
(58) Field of Search .................... 348/745, 744, 348/746, 747, 806, 807, 813, 814, 601, 600, 589, 180, 181, 177, 189, 190, 191; 358/368.12, 368.11, 368.13, 368.24

(56) References Cited

U.S. PATENT DOCUMENTS

| 5,231,481 A | * | 7/1993 | Eouzan et al. ............... 348/658 |
| 5,260,797 A | * | 11/1993 | Muraji et al. ................ 348/745 |
| 5,463,427 A | * | 10/1995 | Kawashima ................. 348/806 |
| 5,475,447 A | * | 12/1995 | Funado ........................ 348/745 |
| 5,532,764 A | * | 7/1996 | Itaki ........................... 348/745 |
| 5,883,476 A | * | 3/1999 | Noguchi et al. ........ 315/368.12 |
| 6,128,048 A | * | 10/2000 | Cho ........................... 348/745 |

* cited by examiner

Primary Examiner—Michael H. Lee
Assistant Examiner—Jean W. Désir
(74) Attorney, Agent, or Firm—Joseph S. Tripoli; Harvey D. Fried; Francis A. Davenport

(57) ABSTRACT

A method for adjusting convergence in a projection television receiver, in which a marker contained in a projected image is adjusted by a manipulated variable to illuminate a photosensor arranged adjacent to the projection screen. The method employs two markers which are moved towards the sensor from opposite directions with a varying step size. The sensor supplies an output voltage indicating lighting by the two markers in conjunction with two mutually spaced manipulated variables. A mean value of the two manipulated variables is used as the manipulated variable for the marker.

10 Claims, 3 Drawing Sheets

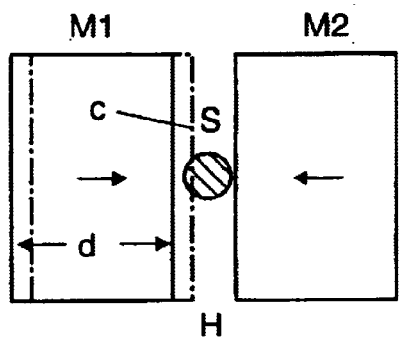
Fig. 3A
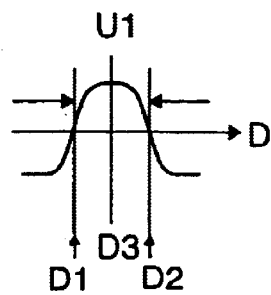
Fig. 3B
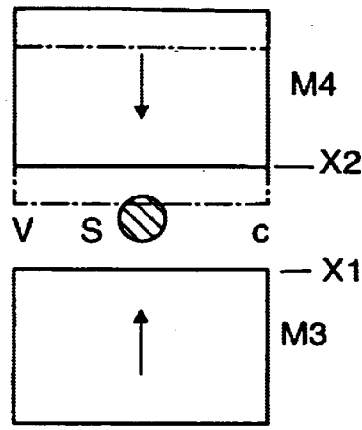
Fig. 4
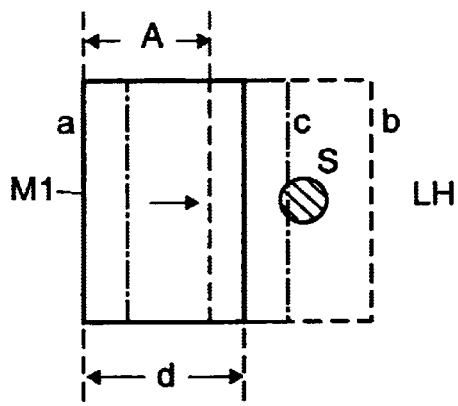
Fig. 5
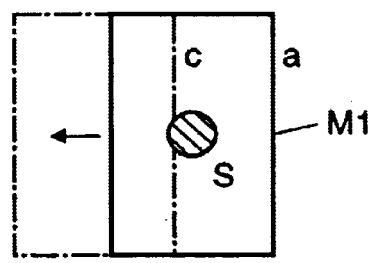
Fig. 6
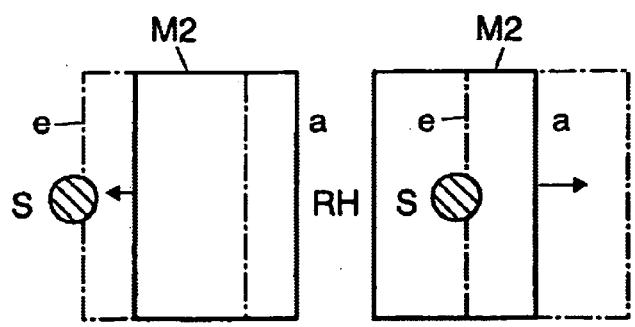
Fig. 7
Fig. 8

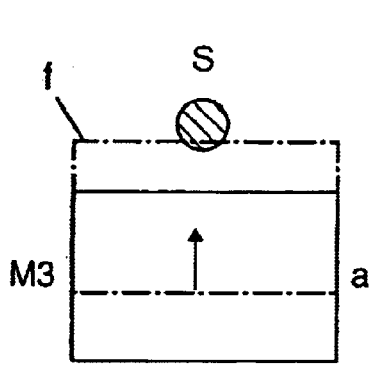
Fig.9
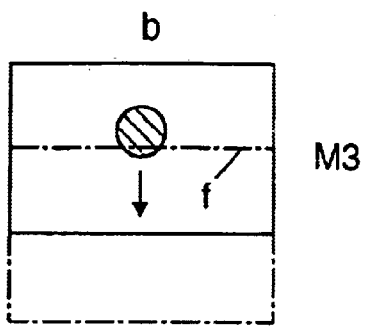
Fig.10
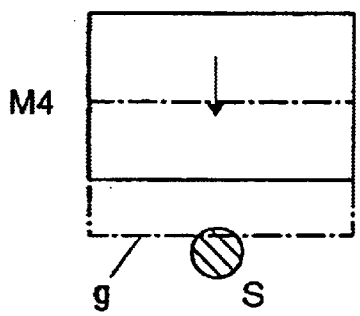
Fig.11
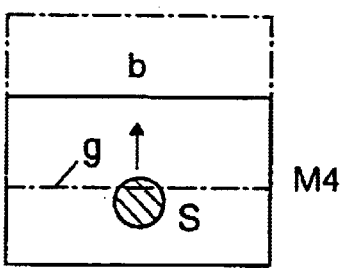
Fig.12
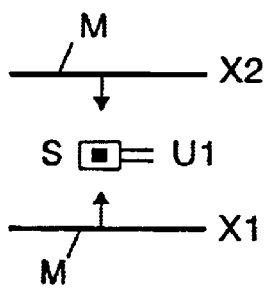
Fig.13
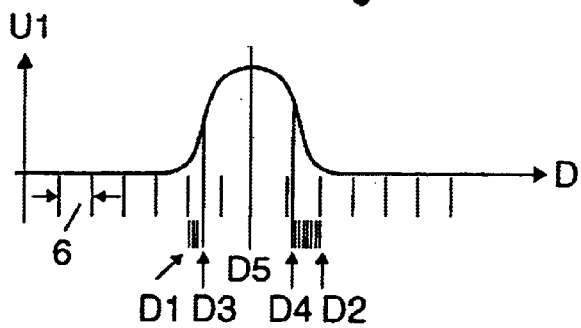
$D5 = (D3 + D4)/2$    Fig.14
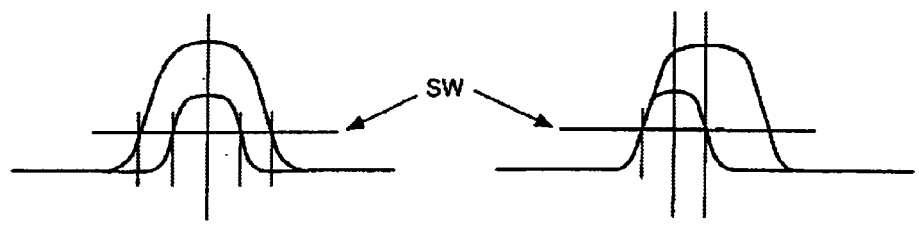
Fig.15    Fig.16

METHOD FOR ADJUSTING CONVERGENCE IN A PROJECTION TELEVISION RECEIVER

CROSS REFERENCE TO RELATED APPLICATIONS

This application is a continuation in part of applicaton Ser. No. 08/990,935 filed Dec. 15, 1997 now abandoned, which claims priority under 35 U.S.C. § 119 from German Patent Application 197 00 204.8.

BACKGROUND OF THE INVENTION

The invention relates to a method for adjusting convergence in a projection television receiver and in particular to an automated convergence adjustment method.

In a projection television receiver, it is necessary to adjust the convergence during production or automatically in each case when switching on. This means that the three pictures projected onto the picture screen for the primary colours R, G, B must be brought to coincidence for each point of the picture.

It is known to image on the screen a grating or grid pattern comprising horizontal and vertical lines which forms a multiplicity of intersecting points. Convergence correction values are determined at each intersecting point of the grid. As a rule, there are six values for each point, specifically values for each colour, R, G and B, in the horizontal and vertical scanning directions. The correction values for each intersection point are stored in a digital memory. During reproduction, the correction values are extracted from the memory and converted into analogue correction values by digital/analogue converters, and used to correct convergence at each intersecting grid point. The correction of the convergence between the grid points in the horizontal and vertical directions is performed as a rule by low-pass filtering or by interpolation of the correction values.

It is also known to fit sensors in the form of photodiodes adjacent to the screen either inside or outside the visible picture, as depicted in FIG. 1B. A so-called marker block in the form of a monochrome image, that is to say red, green or blue picture point or marker is inserted into the video signal to be projected to form a picture on the screen. For optimal convergence, in each case for the primary colours R, G, B and in the horizontal and vertical directions, this projected marker on the picture screen must in each case impinge on an assigned sensor.

The adjustment of the marker to the sensor is achieved by influencing the deflection in the picture tubes which are subject in practice to a multiplicity of errors such as, in particular, drift, background brightness, sensitivity, changes in threshold value, de-focusing and lens errors. One difficulty and inaccuracy consists in the following:

When the projected marker is located beyond the sensor it does not illuminate the sensor which consequently does not output a marker generated signal. Hence the convergence correction circuit has no information as to whether the projected marker is located on the left or right of the sensor in the case of the horizontal convergence, or below or above the sensor in the case of the vertical convergence, nor as to the direction in which it must move to find the sensor. There is then a need for a search, which can, with a certain probability, lead in the wrong direction. In a multiplicity of cases, the marker therefore has to continue the search in the opposite direction if it does not find the sensor in the first adjusting direction. This means a loss of time, which can be perceived as disturbing during switching on, in particular in the case of automatic convergence adjustment.

SUMMARY OF THE INVENTION

It is the object of the invention to provide a method for adjusting the convergence in a projection television receiver, in which the said errors are corrected. In one embodiment of the invention, it is achieved, furthermore, that at the start of the convergence correction the marker automatically carries out a movement in the correct direction relative to the sensor and a search operation in the wrong direction is avoided.

The essence of the invention is thus that two markers are moved towards the sensor from opposite directions with a varying step size until the sensor supplies an output voltage indicating light for the two markers in conjunction with two mutually spaced manipulated variables, and in that a mean value of the two manipulated variables is used as manipulated variable for the marker.

Thus, in the case of the invention the marker approaches the sensor by using markers which approach the sensor from opposite directions. The finite dimensions of the marker and the sensor thus provide two mutually spaced manipulated variables because, for example, in the case of the horizontal convergence the marker impinging on the sensor from the left and the marker impinging on the sensor from the right necessarily impinge on the marker in conjunction with different manipulated variables in the horizontal direction. The optimum manipulated variable can thus be determined by averaging between these two manipulated variables, and can be used for the convergence.

In one embodiment of the invention, the area of the marker is large by comparison with the area of the sensor. The marker preferably has a rectangular or square area comprising a multiplicity of successive lines with the whole line duration or a part thereof. The dimension of the marker in the direction of the adjustment relative to the sensor is larger in this case than the adjustment range of the marker, both for the horizontal convergence and for the vertical convergence. The dimension, the adjustment range and the position of the marker relative to the sensor are matched to one another such that in its end setting in the adjusting direction towards the sensor, the marker does not leave the sensor, and in its end setting in the adjusting direction away from the sensor it leaves the sensor. The area of the marker is preferably equal to the area which is enclosed by grid lines of a grid pattern which is represented on the picture screen and defines convergence intersection points.

By virtue of this embodiment of the invention, it is possible, as will be explained in more detail in the description, to achieve that in each case a marker can already detect at the instant of the start of the convergence correction, without a movement and purely on the basis of its output signal, whether it is on the left of the sensor and thus must be moved to the right, or whether it is located on the right of the sensor and therefore must be moved to the left to find the sensor, in order to strike the sensor. As a result, time is saved in adjusting the convergence, for example in each case when switching on the set, and convenience for the customer is enhanced.

Another embodiment of the invention operates using the following steps:

a) the manipulated variable is changed in large steps such that the marker is moved from the first side towards the sensor until, in conjunction with a first value of the manipulated variable, the sensor supplies a signal triggered by the marker, b) the manipulated variable is moved back by one step to the second value, situated therebefore, c) the manipulated variable is changed again in the direction towards the sensor in smaller steps, until the sensor again supplies a signal in conjunction with a third value of the manipulated variable, d) the steps a)–c) are carried out likewise by moving the marker from the other side towards the sensor, a fourth value thereby being produced, and e) the mean value between the third value and the fourth value is used as manipulated variable for the convergence.

The step width of the large steps is in this case approximately 5–10 times the step width of the smaller steps. The marker can be formed by a monochrome, bright line in a background which is dark in the adjustment range. The large steps preferably have a step width such that the marker cannot jump over the entire sensor with one step. This embodiment of the invention permits the particularly accurate alignment of the marker onto the sensor, the influence of the inaccuracy parameters mentioned at the beginning on the convergence correction being eliminated to the greatest extent.

BRIEF DESCRIPTION OF THE DRAWINGS

The invention is explained below with reference to an exemplary embodiment and with the aid of the drawing, in which:

FIGS. 3A and 4 show a detailed screen view depicting the basic mode of operation of the first embodiment, FIG. 3B depicts a sensor signal during illumination by markers M1 and M2 of FIG. 3A, FIGS. 5, 6 show a detailed screen view depicting the movement of the left-hand marker relative to the sensor for the horizontal convergence, FIGS. 7, 8 show, correspondingly, the movement of the right-hand marker relative to the sensor, FIGS. 9–12 show the corresponding marker movement for the vertical convergence, FIGS. 13, 14 show the mode of operation of the said second embodiment of the invention, and FIGS. 15, 16 show diagrams for explaining the advantages achieved by the invention.

DETAILED DESCRIPTION

Figure 1B:
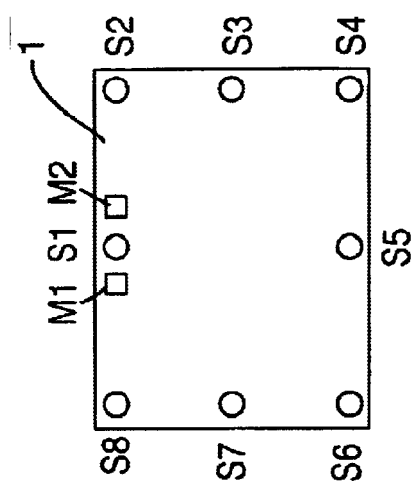
FIG. 1B depicts an exemplary screen edge arrangement with multiple sensors.
Figure 1A:
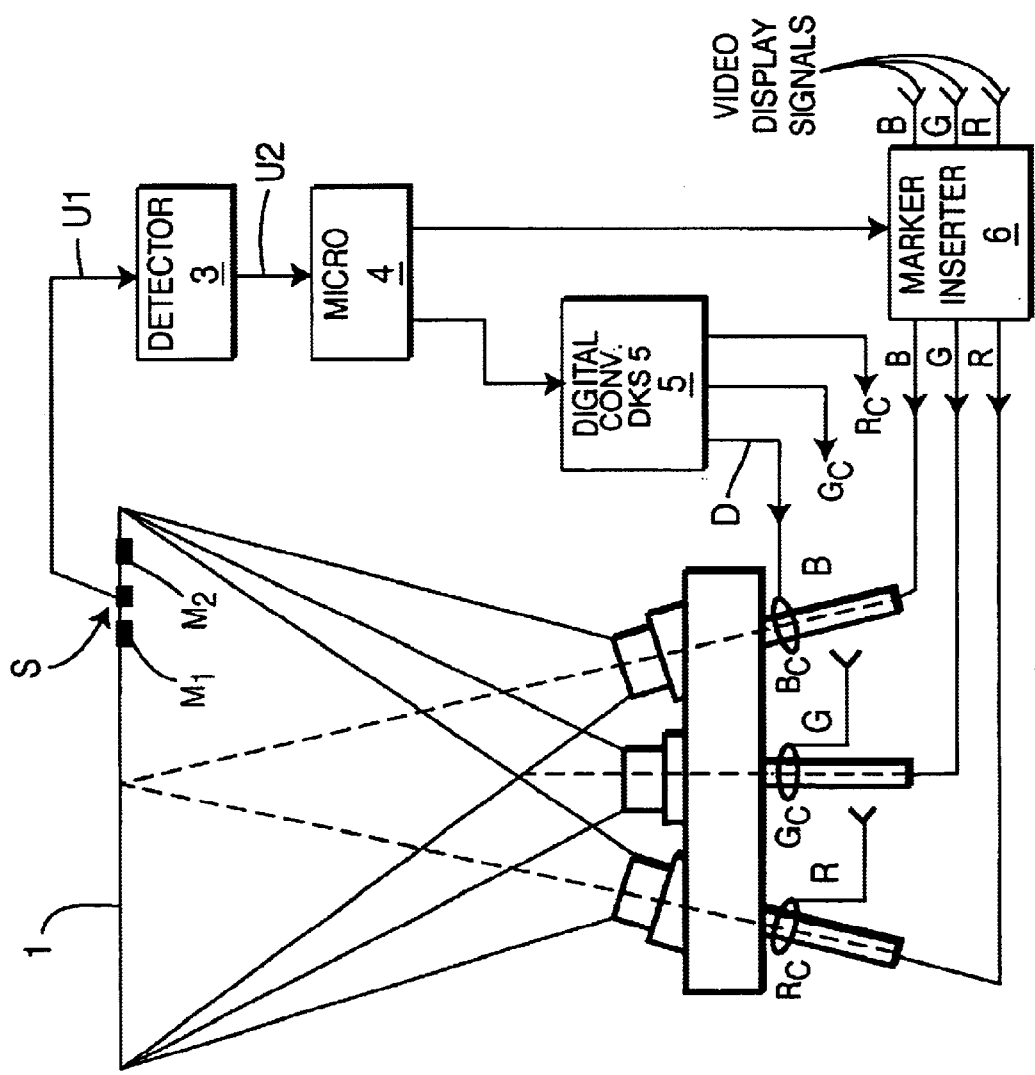
FIG. 1A shows the principle of a design of a projection television receiver including inventive arrangements.

FIG. 1A shows a projection television receiver with three monochromatic picture tubes for the primary colors R, G, B. Each picture tube projects an image of the corresponding color onto the picture screen 1, the projected images being brought to coincide yielding a color picture. A number of sensors can be located inside or outside the picture area of screen 1, as depicted in exemplary FIG. 1B, to facilitate convergence error measurement at the centre edges and corners of a projected picture. FIG. 1A shows an exemplary single photodiode sensor S. Each of the three primary colors R, G, B signals supplied to respective cathode ray tubes are controlled to permit the insertion of a measurement marker. The marker takes the form of a bright monochrome block, that is to say pure red, green or blue picture block positioned on a dark or black background. Marker M forms illumination 2 (depicted in FIG. 2), and must impinge or illuminate exemplary sensor S to achieve optimal convergence. This marker illumination is detected by sensor S which generates an output signal U1 only when impinged or illuminated by the projected marker image. The output signal has a maximum value when marker M fully illuminates the sensor S, or when the marker is located on the sensor S with its entire area or extent.

The output signal U1 from photosensor S is coupled to detector 3 which generates a binary output signal U2 where, for example, a logical 1 represents "light" or illumination of photosensor S, and a logical zero represents "no light" or no marker illumination of photosensor S. Signal U2 is coupled to microprocessor system 4 where the presence of photosensor illumination results in the generation of convergence error or correction signal which is coupled to a digital convergence system DKS 5 for storage in a memory location specific to each color and scanning direction. The digital convergence block 5 contains digital to analog converters which generate convergence signals for coupling to deflection correction coils Rc, Gc and Bc located on the necks of respective red, green and blue CRTs. An exemplary convergence signal D is produced by the convergence system and is shown coupled to an exemplary deflection coil Bc mounted on the blue CRT. Exemplary signal D provides variable movement or manipulation of the blue marker M such that the projected marker image is positioned to illuminate photosensor S and establish a convergence value for the blue marker at the location of sensor S. If signal U2 represents logical zero indicating no illumination of the photosensor, microprocessor 4 controls the marker position by means of an algorithm such that variable D causes the projected marker to search screen 1 until photosensor S is illuminated and signal U2 assumes a logical 1 state.

Microprocessor 4 is also coupled to a marker inserter 6 which sequentially controls the generation and insertion of marker M into the video signal of each color signal that is being automatically adjusted. Generation and ark insertion of a marker block is well known in the art, an example is described in U.S. Pat. No. 4,218,698. However, since the marker represents a high brightness image on a dark or black back ground, the video signal of the color under automatic adjustment can be controllably switched, for example within inserter 6, to a black level signal value containing a peak level signal representing the marker block. Thus when signal U2 indicates that the projected marker image is positioned and illuminates the photosensor, microprocessor 4 controls the digital convergence circuit (DKS)5 to reposition the marker image to illuminated another sensor, for example as depicted in the measurement arrangement of FIG. 1B. In this way the projected marker image can be repositioned to each sensor to establish convergence values for the exemplary blue marker at each sensor location. Following the establishment of convergence values for the exemplary blue CRT picture, microprocessor 4 controls inserter 6 to insert the marker into each of the other color channels in sequence to establish convergence values for each color at each sensor location.

Figure 2:
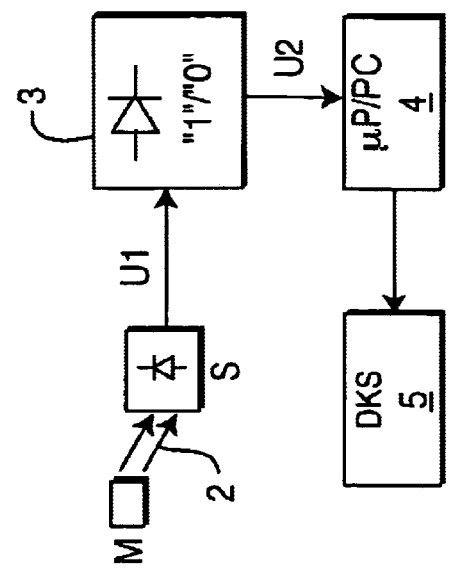
FIG. 2 shows the basic mode of operation of the convergence correction with one marker and one sensor.

FIG. 2 shows a simplified block diagram for such a convergence correction. The projected marker M transmits a light beam 2, which strikes the sensor S in the middle in the case of an optimal convergence setting. When the image of marker M impinges, the sensor S supplies an output voltage U1 which passes onto the detector 3. The detector 3 detects whether light 2 passes from the marker M onto the sensor S, and thus essentially supplies a binary voltage with "1" ="light" and "0" = "no light". The digital signal U2 thus obtained passes on to the microprocessor or personal computer 4, which supplies a signal to the digital convergence circuit (DKS)5. The circuit 5 contains digital memories, inter alia. Stored in the memory are convergence correction values which influence the convergence correction such that the marker M impinges on exemplary sensor S for each of the three primary colors R, G, B in the horizontal and vertical scanning directions.

FIG. 3 shows the basic mode of operation of a first embodiment, in which the search for exemplary sensor S is performed by two markers M1 and M2 which are moved towards the sensor S from opposite directions, that is to say from the left and from the right. The dimension d of the markers M1 and M2 in the direction of displacement is large in this case by comparison with the dimension of the sensor S and is for example, 20 mm in practice. Marker M1 is moved towards the sensor S until its edge just touches or begins to cut sensor S, with the sensor generating an output signal U1 for coupling to the evaluation or detector 3 circuit.

This signal results as a consequence of the dashed and dotted edge depicted as c of marker M1. In this position, a first manipulated variable D1 results for the convergence correction. Likewise, marker M2 which is assigned to the right-hand side of the sensor S is moved towards the sensor S until its left-hand edge just impinges on the sensor S. A second manipulated variable D2 is obtained as a result and deviates from the first manipulated variable. The mean value D3 of the two manipulated variables D1, D2 is then used as correcting quantity for the sensor position. FIG. 3B depicts sensor signal U1 amplitude resulting from illumination by respective markers M1, M2 positioned by respective manipulated variables D1 and D2. FIG. 3B also indicates that mean value D3 corresponds a maximum sensor output. Similarly, in FIG. 4 two markers M3 and M4 are depicted above and below sensor S for adjusting the convergence in the vertical scanning direction V. The operation for determining the correcting quantity for the vertical convergence is performed in accordance with the method described for FIG. 3.

A stepwise approach and accurate alignment of the markers M3 and M4 onto sensor S is performed in the following way: it may be assumed that a marker M can be adjusted over the range X1/X2 for the direction of the convergence in the vertical direction for the red picture R. The upper line of the marker for red is adjusted to the middle position of the adjustment range by feeding the corresponding correction data to the correction channel for red. The algorithm then moves the marker M into the position in which the upper line of the marker M just touches or begins to touch sensor S. For this purpose, the sensor output is evaluated by detector 3 to whether it receives light or receives no light. If "no light" is detected, the correction data are increased by the differential value delta =(X1+X2)/4. If "tight" is detected, the data are reduced by the differential value delta =(X1+X2)/4. The differential value delta is then changed to the value delta/2. This operation is continued until the integral part of delta <0. The correcting manipulated variable is obtained in this way. The same operation is carried out to determine the upper boundary. In this case, the first step is to adjust the lowermost line of the red marker to the middle position of the adjustment range, that is to say to (X1+X2)/2. If "no light" is detected, the manipulated variable is reduced by delta. The manipulated variable D2 is finally obtained thereby. The correct position of the sensor S is then calculated as (D1+D2)/2. The same operation is carried out correspondingly for the horizontal convergence and for green and blue.

FIG. 5 shows in detail the adjustment of the left-hand marker M1 of FIG. 3 for the horizontal direction H. The marker M1 is firstly located on the left of the sensor S outside the sensor S, as indicated in the position a. The dimension d of the marker M1 in the direction of adjustment is in this case greater than the adjustment range A of the marker M1. This means that the marker M1 cannot leave the sensor S to the right, as indicated by the dashed position b. This gives rise to the following advantage: if at the start of the correction the output signal U1 of the sensor S has the value "0", that is to say "no light" is detected, the marker M1 can be located only to the left of the sensor S, because it cannot leave the sensor S in the right-hand end position, and the signal "1" would therefore be generated. If at the start of the correction the sensor S outputs the output signal "1", the sensor M1 must be located on the right of or too far to the right from the sensor S, because on the left of the sensor S it would not strike the sensor S. Thus, it is already possible to detect from the static output signal of the sensor S at the start of the convergence correction without a search whether the marker M1 is located to the left of the sensor S, therefore must be moved to the right to find the sensor, or whether it is located on the right of the sensor S and must thus be moved to the left. The adjustment is performed in each case such that the righthand limiting edge of the marker M1 just touches or starts to cut the sensor S on the left-hand side, as is represented by the dashed and dotted edge c.

FIG. 6 shows the left-hand marker M1 in the right-hand end position relative to the sensor S. As already explained, the marker M1 cannot leave the sensor S, with the result that the sensor S supplies the output signal U1 ="1"="light". From this signal, the correction circuit detects that the marker M must move to the left for the correction adjustment onto the sensor S, specifically until the edge c again just begins to cut the sensor S on the left-hand side.

FIGS. 7 and 8 show the same relationships for the right-hand marker M2 for the convergence in the horizontal direction. In FIG. 7, the marker M2 is located on the right of the sensor S. This is detected by virtue of the fact that the sensor S outputs the signal "0", that is to say "no light". The circuit therefore has the information that the marker M2 must be moved to the left in order to find the sensor S, again until the left-hand edge e just touches or begins to touch the sensor S. In FIG. 8, the marker M2 is located in the initial position too far to the left of sensor S. This is detected by virtue of the fact that the sensor S now indicates the signal "1"="light" at the start of the correction. The circuit then detects that for the purpose of adjusting the correct position e the marker M2 must be moved to the right relative to the sensor S.

Two different manipulated variables are then produced from the adjustments of the left-hand marker M1 onto sensor S in accordance with FIGS. 5, 6 and the adjustments of the right-hand marker M2 onto sensor S in accordance with FIGS. 7, 8. The arithmetic mean value is formed from these two manipulated variables and used to adjust the horizontal convergence.

FIG. 9 shows the same relationships for the vertical convergence. In FIG. 9, the lower marker M3 is located below the sensor S. This is detected by virtue of the fact that the sensor S outputs the signal "0". The marker M3 must thus be moved upwards for the adjustment of the marker M3 as far as the correct position in accordance with the edge f.

In FIG. 10, the lower marker M3 is located in the initial position above or too far above the sensor S. This is detected by the output signal "1"="light". The marker M3 must then be moved downwards as far as into the desired position in accordance with the edge f.

FIG. 11 shows the marker M4 assigned to the upper edge of the sensor S in the initial position a outside the sensor S. This is detected, again, by virtue of the fact that the output signal of the sensor S has the value "0"="no light". The circuit then displaces the marker M4 downwards as far as into the desired position g.

In FIG. 12, the upper marker M4 is located too far down relative to sensor S, as detected by the output signal "1". It is therefore moved upwards by the circuit as far as into the desired position g relative to sensor S. Thus, it is already possible also to detect for markers M3 and M4, for the vertical convergence from the stationary output signal in the initial position of the correction, where marker M is located relative to sensor S, and in which directions it must be moved for the correct adjustment onto sensor S.

In summary, it therefore holds for the detection of the initial position and the marker movement, resulting therefrom, for achieving the said alignment is with the sensor for the vertical convergence that:

Lower marker M3:

Sensor signal "0"="dark": marker movement upwards

Sensor signal "1"="bright": marker movement downwards

Upper marker M4:

Sensor signal "0"="dark": marker movement downwards

Sensor signal "1"="bright": marker movement upwards.

FIGS. 13 and 14 show an exemplary embodiment for the said second embodiment. The marker M has only a small dimension in the direction of adjustment, comprising, for example, only a bright, red, green or blue line or a few bright lines of the respective primary color to be adjusted inside an area which is black at least in the adjustment range. The marker M is initially adjusted to its lowermost position of adjustment range X1 by feeding the channel for the vertical convergence the lowest manipulated variable D within the adjustment range. The manipulated variable D is then increased in accordance with FIG. 14 in large steps 6 such that the marker M moves towards the sensor S until the marker M reaches the sensor S. This is detected by the output signal U1 of the sensor going over from "0"="no light" to "1"="light". The large steps 6 are dimensioned such that the marker M cannot jump over the sensor S without illuminating the sensor S. Within the adjustment values, formed by the large steps 6, for the manipulated variable D, the last value D1 before the detection of the illumination of the sensor S inside the grid of the large steps 6 is stored.

Thereafter, the marker M is repositioned to its uppermost end position X2 by applying the highest convergence correction manipulated variable D. The manipulated variable D is then reduced in large steps 6, and the manipulated variable D2 is determined as in the case of D1. Subsequently, the manipulated variable is increased in small steps starting from D1 until in the case of the value D3 the output signal U1 becomes ="1", that is to say indicates "light". The manipulated variable D is likewise reduced in small steps starting from D2, specifically down to the value D4 at which the sensor S outputs the output signal U1 ="1".

This approach of the marker M to the sensor S from two directions thus produces two values D3 and D4 for the manipulated variable D, which are situated symmetrically relative to the optimum value which locates the marker image precisely in the middle of the sensor S. This value D5 is now determined by D5=(D3+D4)/2.

This method is also repeated for the two other primary colors and for the horizontal convergence and the vertical convergence.

FIGS. 15 and 16 illustrate once again the advantage achieved by the invention. In FIG. 15, the symmetrical evaluation of the curve in accordance with FIG. 14 in the case of the threshold value SW has the effect of achieving the adjustment of the marker, indicated by the two curves, precisely to the middle of the sensor. FIG. 16 holds for the case in which a marker is moved towards the sensor only from the left-hand side, and detects the impingement on the sensor only on this side in the case of the threshold value SW. An asymmetrical position is then reached, as the two curves in FIG. 16 show. That is to say, the marker is then not adjusted to the middle of the sensor.

What is claimed is:

1. A method for determining convergence error in a projection television receiver having a projection screen and photosensor positioned for illumination by a projected image, the method comprising the steps of:

projecting two markers to form images on said screen;

moving said markers and said images towards said photosensor from opposite directions until said photosensor is illuminated by each marker image;

defining respective variables related to said moving of each said marker and image to illuminate said photosensor; and, storing a mean value of said respective variables as a convergence error associated with said photosensor.

2. The method of claim 1, wherein an area of each said marker is large in comparison with the area of said photosensor.

3. The method of claim 1, wherein each said marker is formed by a rectangular or square bright area of a primary color having a convergence error determined and said marker comprising a multiplicity of successive lines with a whole line duration or a part thereof.

4. The method of claim 1, wherein a dimension of the marker is equal to or greater than the adjustment range of the marker in the direction of the adjustment relative to the sensor.

5. The method of claim 4, wherein the dimensions, the adjustment range and the position of said markers relative to said sensor are matched to one another such that in its end setting in the adjusting direction towards said sensor, said markers do not leave said sensor , and in its end setting in the adjusting direction away from said sensor it leaves said sensor.

6. The method of claim 4, wherein an area of said markers is equal to an area enclosed by grid lines of a grid pattern displayed on the picture screen and defining convergence intersection points.

7. The method of claim 1, further comprising the following steps:

a) a variable is changed in large steps such that one of said two markers is moved from a first side towards the sensor until, in conjunction with a first value of said variable, the sensor supplies a signal triggered by said one of said two markers, b) said variable is moved back by one step to a second value, situated there before, inside a pattern of one step of said large steps, c) said variable is changed again in the direction towards the sensor in smaller steps, until the sensor again supplies a signal in conjunction with a third value of the manipulated variable, d) the steps a) to c) are carried out likewise by the other marker of said two markers moving from the other side towards the sensor, a fourth value thereby being produced, and e) a mean value between the third value and the fourth value is used as a variable for the convergence.

8. The method of claim 7, wherein the step width of the large steps is approximately 5 to 10 times the step width of the small steps.

9. The method of claim 7, wherein the marker is formed by a monochrome bright line in a dark background.

10. The method of claim 7, wherein the large steps have a step width such that said marker cannot jump over the entire sensor with one step.

* * * * *